July 20, 1943.    J. L. HIPPLE    2,324,840
AGRICULTURAL IMPLEMENT
Filed Dec. 23, 1940    2 Sheets-Sheet 2

Inventor
James L. Hipple
By Paul O. Pippel
Atty.

Patented July 20, 1943

2,324,840

UNITED STATES PATENT OFFICE 2,324,840

AGRICULTURAL IMPLEMENT

James L. Hipple, Canton, Ill., assignor to International Harvester Company, a corporation of New Jersey Application December 23, 1940, Serial No. 371,260

13 Claims. (Cl. 97—50)

This invention relates to agricultural implements of a type adapted to be connected to a tool-supporting means or tractor and for movement to and from their working position. More particularly, the invention relates to the moving or lifting means and an adjustable stop means associated therewith.

It is an object of the present invention to provide, associated with the lifting means, an adjustable stop adapted to be carried by and so arranged with respect to the lifting means or its supporting structure, that it is attachable to or removable from the tractor along with the lifting means.

It is another object of the invention to provide an arrangement including a fluid actuated device wherein the same is supported on the same supporting structure as the lifting rock-shaft and as the adjustable stop means.

It is still another object of the invention to provide a simple construction in a power lifting arrangement incorporating the use of an adjustable stop means.

According to the present invention, the lifting rock-shaft is connected to the rear axle structure of the tractor for rockable movement and this rock-shaft has thereon an arm means adapted for independent movement and connected to the working tool. On the rockable structure there is provided an abutment arm adapted to engage the underside of the arm means to impart lifting movement to the working tool means. Also, on this same rock-shaft is journaled an adjusting lever adatped to cooperate with the arm means for limiting the downward movement of the working tool. The rock-shaft, the arm means, and an adjustable lever are carried by the same supporting structure which is in turn adapted to be attached to the rear axle structure of the tractor. The adjusting lever works over a quadrant which is attached to the same supporting structure. The rock-shaft is rocked by a single acting fluid actuated cylinder device which is also supported on the same supporting structure. With the various parts so arranged, the entire assemblage including the adjustable stop means and fluid actuated cylinder can be removed from the tractor as a unit. In other words, all of these parts have the same and common attaching means for their attachment to an attaching portion formed on the tractor.

For other objects and for a better understanding of the invention, reference may be had to the following detailed description taken in connection with the accompanying drawings, in which:

Figure 2 is a view similar to Figure 1 but of a lesser portion of the tractor and illustrating the position of the lifting means when it has been actuated to effect lifting of the working tool means;

Figure 3 is a perspective view of the rear portion of the tractor and of the lifting means and with the elements at one side of the lifting means in exploded positions to illustrate their sequence of assembly to the end of the rock-shaft; and, Figure 4 is a detail perspective view of the lifting arm as journaled to the rock-shaft.

Figure 1:
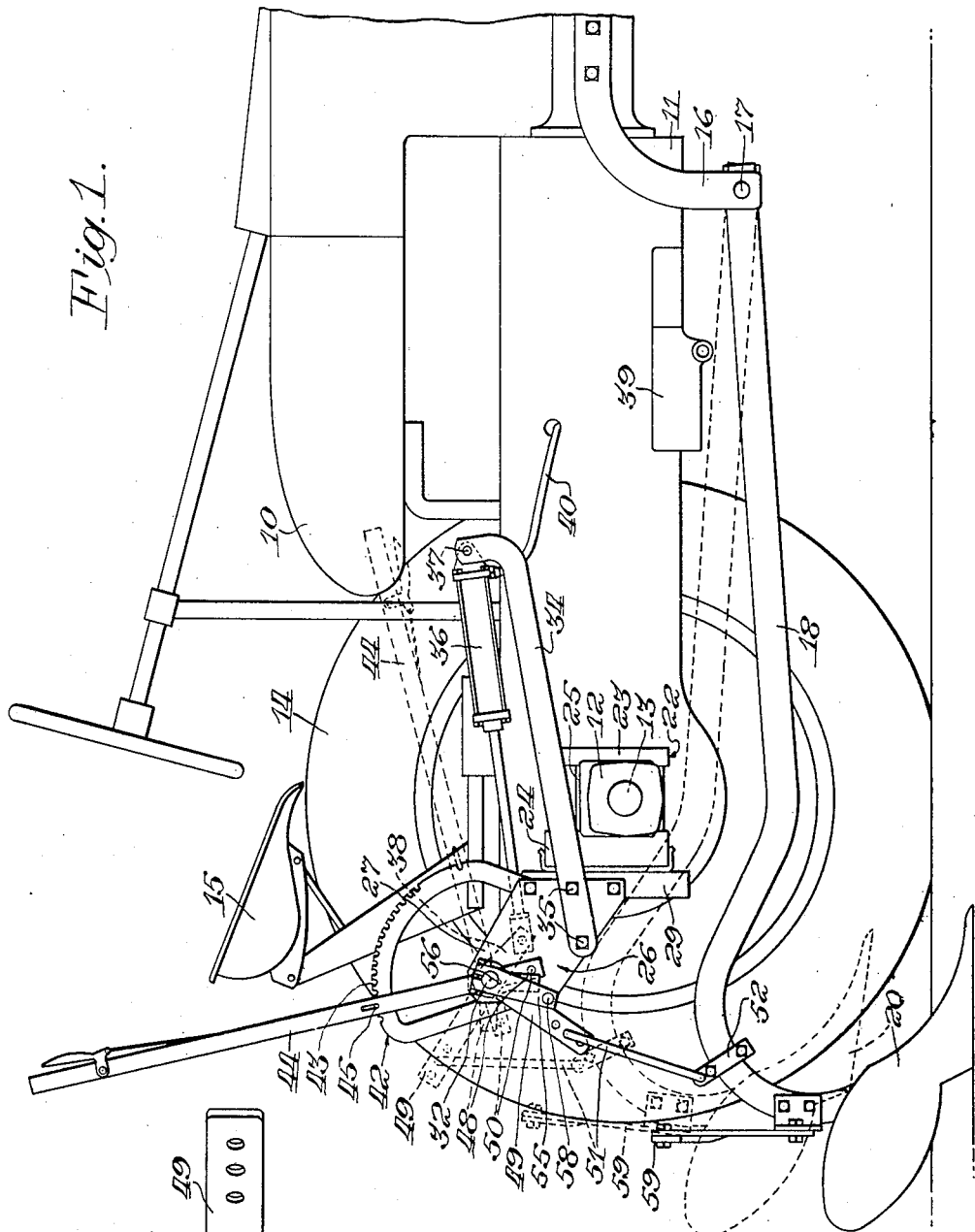
Figure 1 is a view in elevation of a rear portion of a tractor with one of its drive wheels removed and showing the connection of a working tool and of the lifting means of the present invention connected thereto.

Referring now to the figures, there is shown a tractor or tool-supporting means 10 having a main body portion 11 and a rear axle housing structure 12 extending transversely with respect to the body portion 11. Extending through the rear axle structure 12 is a rear drive axle 13 to which is connected a drive wheel 14. On the rear axle structure 12 is an operator's station 15.

On the body portion 11 is a depending bracket 16 to which is pivotally connected for vertical movement as indicated at 17, a pair of longitudinally extending tool beams 18 and 19. These tool beams extend rearwardly to a location in rear of the rear axle structure 12 and respectively carry working tools illustrated as middlebuster bottoms 20 and 21.

Connected at each side of the body portion 11 of the tractor and to the rear axle housing extending respectively to the opposite sides thereof, is an attaching means 22. This attaching means remains fixed to the tractor and includes generally two vertically extending elements 23 and 24 retained by clamping bolts 25. This attaching means and the rear axle housing provides an attaching portion on the tractor to which may be attached the lifting arrangement indicated generally at 26 and including the features of the present invention.

The lifting arrangement 26 includes a supporting structure which takes the form of vertically extending supporting plates 27 and 28 respectively having vertical attaching elements 29 and 30 adapted for attachment to the vertically extending elements 24 of the attaching means 22 by means of the fastening bolts 31.

The elements 29 and 30 are so formed as to permit easy attachment of the bolts 31.

Rockably or movably mounted in the vertically extending supporting plates 27 and 28 is a rockable or movable means 32 in the form of a transverse rock-shaft extending between the plate means 27 and 28 and extending transversely to a location beyond and at the respective sides of the same.

On the vertically extending supporting plate 27 and extending forwardly thereof above the rear axle structure and to a location forwardly of the same, is a bracket 34 fastened thereto by means of bolts 35. This bracket 34 serves as a support for a fluid actuated device 36 pivotally connected to the forward end of the bracket 34 as indicated at 37 and extending rearwardly for connection to an arm 38 rigidly connected to the rock-shaft 32 for the purpose of rocking the rock shaft. Fluid is supplied to the fluid actuated device 36 from a fluid housing 39 mounted partially within the body portion 11 of the tractor and from which fluid is delivered by a fluid communication 40. The fluid housing 39 and the pump arrangement for the delivering of fluid through the fluid communication 40 may be of the form shown in the pending application on "Hydraulic lifting arrangements," Serial No. 326,059, filed March 26, 1940, in the name of Carl W. Mott. It should now be apparent that the fluid actuated device 36 by means of the bracket 34 is connected to the same supporting structure that the transversely extending rock-shaft or rockable means is connected.

On each of the vertically extending plates 27 and 28, there is rigidly connected a quadrant 42 having a notched portion 43 concentric with the rock-shaft 32. Since the assemblage to be presently described is similar on both ends of the rock-shaft 32, the description will be directed to but one of such assemblies. On the shaft 32 is journaled at its lower end an adjusting lever 44 having a detent mechanism 45 adapted to cooperate with the notched portion 43 of the quadrant 42. The combination of the quadrant and the adjusting lever serves as an adjustable stop means for cooperating with a pivotal arm or movable means 46 also journaled on the end of the shaft 32. This arm means is shown more particularly in Figure 4 and includes a sleeve 47 to which is rigidly connected one short arm 48 and one long arm 49 arranged in angularly spaced relationship with respect to each other. When the arm means 46 is positioned for rotative movement on the rock-shaft 32, the short arm 47 may at one time abut with an abutment portion 50 on the lower end of the adjusting lever 44. To the long arm 48 of the arm means 46 is connected by means of a link 51, fastened at its lower end to a strap 52, the working tool beam 18 or 19 whichever case it may be. When the working tool beam and its working tool is in its working position the free arm means 46 will be rotated in a counterclockwise direction as shown in the figures to abut the abutment portion 50 on the adjusting lever 44. Since the adjusting lever 44 engages with the notched portion 43 of the quadrant which is in turn carried by the supporting plate 27 rigidly fixed to the tractor, it will be apparent that the working tool means will be held against an adjustable stop which in turn reacts against the tractor. It should also be apparent that there has been provided a simple arrangement of an adjustable stop mechanism which is carried on the same supporting structure on which the lifting rock-shaft is carried and that the rock-shaft 32 serves as the immediate support for the lever 44, the lever thereby being provided with a support to which it can be readily journaled.

The arm means 46 is also journaled on the end of the transverse rock-shaft 32 and is adapted to have free angular movement with respect thereto. Rigidly fixed to the outer end of the rock-shaft is an abutment or arm 55. This arm is connected to the shaft by means of a key 56 and is held against axial movement along the shaft by nut and bolt means 57. With this abutment arm 55 fixed to the shaft in its proper angular relation, a transversely extending portion 58 thereof is adapted to engage with the long arm 49 of the arm means 46 when the transverse shaft 32 is rocked in a clockwise direction by means of the fluid actuated device 36. As this abutment strikes the movable arm means 46, the working tools and their respective beams 18 and 19 will be lifted to a transport position and the arm means 46 including the short arms 48 will be rotated away from the abutment 50 on the adjusting lever 44. The parts of the lifting arrangement then take a position such as shown in Figure 2. Should it be desired to retain positively the working tools in their raised position, the respective adjusting levers 44 may be drawn forwardly by the operator to a position shown in dotted lines in Figure 1.

To maintain the working tool beams against lateral movement with respect to each other, there is provided an arch means 59 connected respectively to the rear ends of the longitudinally extending beams 18 and 19. Since each of these beams 18 and 19 are independently connected at 17 to the depending structure 16, it would be apparent from the foregoing that since there is located at each side of the transverse shaft an adjustable stop means that the respective working tools 20 and 21 may be left to operate at different operating depths depending upon the position of the respective adjusting levers 44, or one of the working tools can be made to operate by itself independently of the other as illustrated in Figure 1 which shows the longitudinally extending beam 19 and its working tool 21 raised to the dotted position, the same being retained in that position by means of the operating lever located at the left side of the tractor and placed in the dotted position.

It should now be apparent that there has been provided in the present arrangement a simple construction wherein the adjustable stop means is incorporated in the lifting assemblage and are thereby commonly supported with the lifting elements on the tractor. When the entire assemblage is removed by unloosening of the bolt means 31, the adjusting levers can be removed therewith. This same supporting structure for the lifting elements serves also to support the fluid actuated cylinder whereby the fluid actuated cylinder will also be attachable or removable with the transverse rock-shaft and the adjusting levers.

While various changes may be made in the detail construction of the present invention, it shall be understood that such changes shall be within the spirit and scope of the present invention as defined by the appended claims.

What is claimed is:

1. In combination, tool-supporting means, working tool means connected to the tool-supporting means for movement with respect thereto, means located between the working tool means and the tool-supporting means for moving the working tool means including a movable means having an abutment thereon, a second means movable with respect to the movable means and adapted to be engaged by said abutment to effect movement of the working tool in one direction, and adjusable stop means including a stop member movably carried on the first-mentioned movable means and adapted to react against one of said means and to abut said second movable means to limit thereby the movement of the working tool means in the opposite direction.

2. In combination, tool-supporting means, working tool means connected to the tool-supporting means for vertical movement with respect thereto, means on the tool-supporting means for moving the working tool means, said moving means including a movable structure having an abutment thereon, force-transmitting means carried by the movable structure for movement with respect thereto, said latter means connected to the working tool means and adapted to be engaged by the abutment upon movement of the movable structure to effect thereby movement of the working tool in one direction, an adjustable stop means carried by the movable structure and adapted to react against the tool-supporting means and to abut said force-transmitting means to limit thereby the movement of the working tool in the opposite direction.

3. In combination, tool-supporting means, working tool means connected to the tool-supporting means for vertical movement with respect thereto, means on the tool-supporting means for moving the working tool means including a pivotable structure having an abutment thereon, arm means pivoted to the pivotable structure for movement with respect thereto, said latter arm means connected to the working tool means and adapted to be engaged by the abutment upon pivotal movement of the pivotable structure to effect thereby movement of the working tool in one direction, and adjustable stop means pivotally connected to the pivotable structure and adapted to react against the tool-supporting means and to abut the arm means to limit thereby the movement of the working tool in the opposite direction.

4. In combination, tool-supporting means, working tool means connected to the tool supporting means for vertical movement with respect thereto, means located between the tool-supporting means and the working tool means for moving the working tool means including a rockable means carried by one of the said means, said rockable means having an abutment, an arm pivotably mounted on said rockable means and adapted to be engaged by said abutment to effect movement of the working tool means in one direction, and stop means carried by said rockable means and adapted to react against one of said means and to abut said arm to limit thereby the movement of the working tool means in the opposite direction.

5. In combination, tool-supporting means, working tool means connected to the tool-supporting means for vertical movement with respect thereto, means located between the tool-supporting means and the working tool means for moving the working tool means including a rockable means carried by one of the said means, said rockable means having an abutment, an arm pivotably mounted on said rockable means and adapted to be engaged by said abutment to effect movement of the working tool means in one direction, and adjustable stop means including a stop member adjustable on said rockable means and adapted to react against one of said means to abut said arm to thereby limit movement of the working tool means in the opposite direction.

6. In combination, tool-supporting means, a working tool connected to the supporting means for movement with respect thereto, means on the tool-supporting means for moving the working tool including a rock-shaft, an arm journaled on the rock-shaft for free rotative movement, means for connecting said free arm to the working tool, a second arm rigidly connected to said shaft to rock therewith and having thereon means adapted to abut said first-mentioned arm to impart movement thereto for effecting movement of the working tool in one direction, and adjustable stop means including a member rotatable on the rock-shaft and adapted to react against the tool-supporting means for limiting the movement of the first mentioned arm and working tool in the opposite direction.

7. In combination, tool-supporting means, working tool means connected to the tool-supporting means for movement with respect thereto, means connected between the working tool means and the tool-supporting means for moving the working tool means including a supporting structure adapted to be attached to one of said means, means movably mounted on the supporting structure and having an abutment thereon, a second movable means carried by the movably mounted means and arranged to be engaged by the abutment for effecting movement of the working tool means in one direction, adjustable stop means for limiting the movement of the working tool means in the opposite direction adapted to react against the supporting structure, whereby all of the above-mentioned parts of the moving means are carried on the same supporting structure and are thereby attachable to the tractor as a unit.

8. In combination, a tool-supporting means, working tool means connected to the tool-supporting means for movement with respect thereto, means for moving the working tool means including a supporting structure adapted to be attached to the tool-supporting means, means rockably mounted on the supporting structure and having an abutment thereon, an arm pivoted on the rockable means and connected to the working tool means, said arm arranged to be engaged by the abutment for effecting movement of the working tool means in one direction, and adjustable stop means adapted to react against the supporting structure for limiting the movement of the working tool means in the opposite direction, whereby all of the above-mentioned parts of the moving means are carried on the same supporting structure and are thereby attachable to the tool-supporting means as a unit.

9. In combination, a tractor having an attaching portion, working tool means connected to the tractor for vertical movement with respect thereto, means for moving the working tool means including a supporting structure adapted for attachment to the attaching portion of the tractor, means rockably connected to the supporting structure and having an abutment thereon, means pivoted on the rockable means and adapted to be engaged by the abutment for effecting lifting movement of the working tool means, and adjustable stop means engaging the pivoted means for limiting the downward movement of the working tool means including an adjusting lever pivoted on the rockably connected means and a quadrant member fixed to the supporting sructure over which the adjusting lever is adapted to operate.

10. In combination, a tractor having an attaching portion, working tool means connected to the tractor for vertical movement with respect thereto, means for moving the working tool means including vertically-extending laterally-spaced supporting frame elements connected to the attaching portion of the tractor, a transversely extending rock-shaft journaled in the supporting frame elements and having an abutment arm thereon, an arm connected to the rock-shaft for free rotative movement and adapted to be engaged by said abutment upon the same being rocked to effect thereby lifting movement of the working tool means, and adjustable stop means for limiting the downward movement of the working tool means including an adjusting lever journaled on the rock-shaft and having an abutment adapted to engage the free arm, and a quadrant member fixed to the supporting structure over which the adjusting lever is adapted to operate.

11. In combination, tool-supporting means, working tool means connected to the tool-supporting means for movement with respect thereto, means connected between the tool-supporting means and the working tool means for moving the working tool means including a supporting structure adapted to be attached to one of said means, means movably mounted on the supporting structure and having an abutment thereon, a second means connected to the movably mounted means for movement with respect thereto and adapted to be engaged by said abutment to effect movement of the working tool means in one direction, a fluid actuated device carried by the supporting structure for actuating the movably mounted means, and adjustable stop means for limiting the movement of the working tool means in the opposite direction carried by the supporting structure, whereby all of the above mentioned parts of the moving means are carried on the same supporting structure and are thereby attachable as a unit.

12. In combination, a tractor having a transversely extending axle structure, working tool means connected to the tractor for vertical movement with respect thereto, means for moving the working tool means including a supporting structure adapted for attachment to the axle structure, means rockably connected to the supporting structure and having an abutment thereon, means pivotably connected to the rockable means for free movement with respect thereto and adapted to be engaged by the abutment to effect lifting of the working tool means, a fluid actuated device for rocking the rockable means, bracket means extending from the supporting structure for supporting the fluid actuated device thereon, and an adjustable stop means for limiting the downward movement of the working tool means and carried by the supporting structure, whereby all of the above mentioned parts of the moving means have a common supporting structure and are thereby attachable to the tractor axle structure as a unit.

13. In combination, tool supporting means, working tool means connected to the tool-supporting means for movement with respect thereto, means on the tool-supporting means for moving the working tool means including movable means connected with the working tool means and adapted to be moved to move the implement in one direction, adjustable stop means reactable through said movable means for limiting the movement of the working tool means in the opposite direction, and a common mounting means connecting both the movable means and the adjustable stop means to the tool-supporting means and loosely associated with said movable means and said stop means to facilitate their respective movement and adjustment

JAMES L. HIPPLE.